United States Patent [19]
Walsh et al.

[11] 3,920,068
[45] Nov. 18, 1975

[54] CONCENTRIC DOUBLE-PIPE HORIZONTAL HEAT EXCHANGER FOR FIBER CONTAINING FLUIDS

[75] Inventors: John Joseph Walsh, Parsippany, N.J.; Elmer Allen Hayes, Montpelier, Idaho; Jan Schmidt, Amstelveen, Netherlands

[73] Assignee: Dorr-Oliver Incorporated, Stamford, Conn.

[22] Filed: June 22, 1973

[21] Appl. No.: 372,630

[52] U.S. Cl. .............................. 165/143; 165/156
[51] Int. Cl.² ................................................ F28F 9/26
[58] Field of Search ...................... 165/154–156, 165/183–184, 143, 144, 145, 141, 87

[56] References Cited
UNITED STATES PATENTS

| | | | |
|---|---|---|---|
| 1,833,876 | 11/1931 | McGrath | 165/143 |
| 2,004,391 | 6/1935 | Price et al. | 165/143 |
| 2,445,115 | 7/1948 | Hanranan | 165/141 |
| 2,449,052 | 9/1948 | Brown, Jr. | 165/143 |
| 2,985,435 | 5/1961 | Gross | 165/184 |

Primary Examiner—Albert W. Davis, Jr.
Assistant Examiner—James D. Liles
Attorney, Agent, or Firm—H. M. Snyder; Burtsell J. Kearns; Theodore M. Jablon

[57] ABSTRACT

A concentric double-pipe fluid heat exchange element for horizontal orientation is provided with support for the central pipe consisting of at least one support fin secured to the central pipe and extending into contact with the outer pipe. The support fin is at least coextensive with the flow path of the fluid in the annulus between the pipes. The heat exchanger is intended to operate on fiber-containing fluids.

9 Claims, 8 Drawing Figures

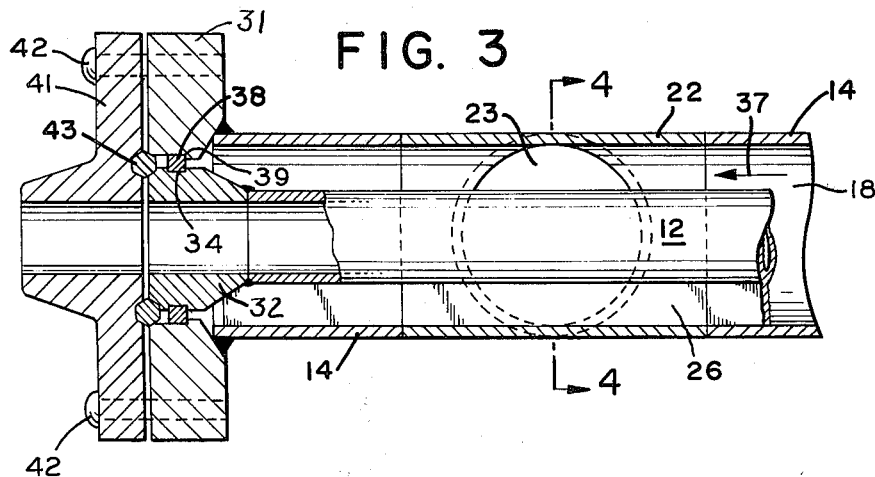
FIG. 3
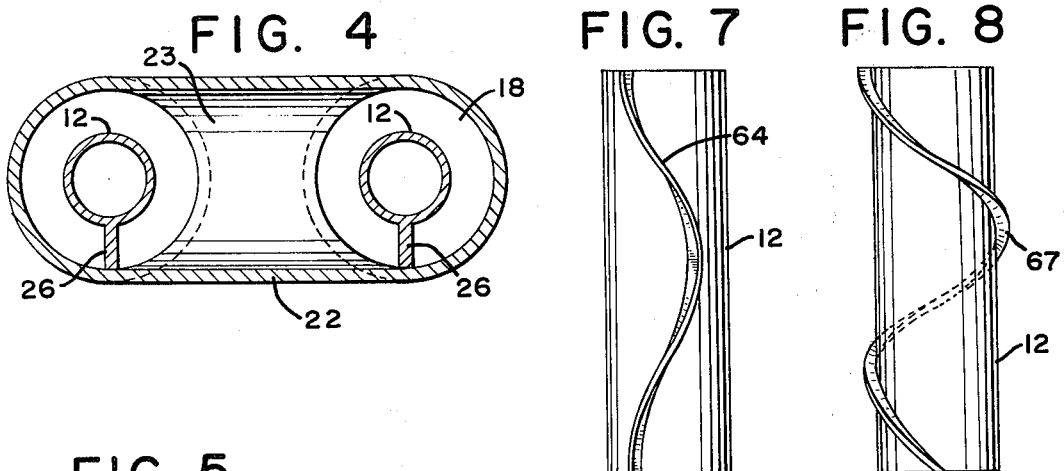
FIG. 4
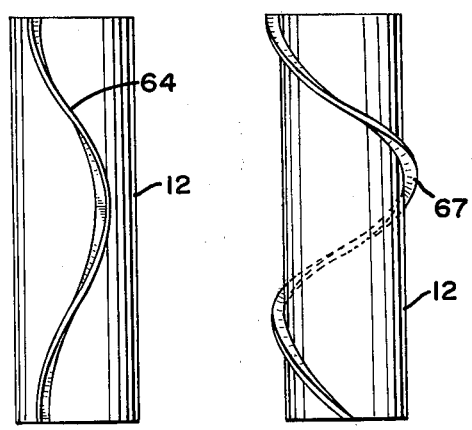
FIG. 7  FIG. 8
FIG. 5
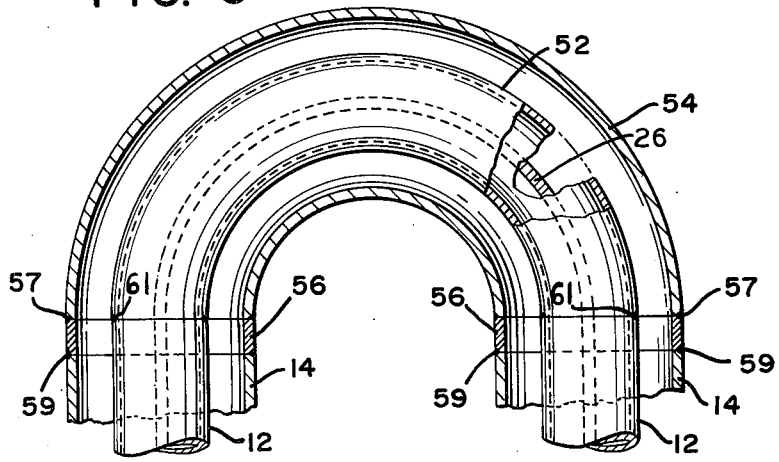
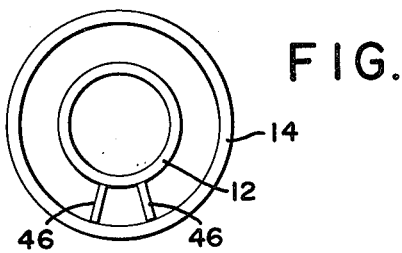
FIG. 6

CONCENTRIC DOUBLE-PIPE HORIZONTAL HEAT EXCHANGER FOR FIBER CONTAINING FLUIDS

This invention is directed to an improved horizontal heat exchanger.

It is well-known that sewage and certain other organic sludges are extremely difficult to dewater due to the gel structure of the sludge particles. Removal of water may be achieved to a satisfactory degree by the application of heat to the sludge which tends to break down the gel structure. The desired heating may be obtained, for example, by direct injection of steam or by heat exchange with a heated fluid. In the course of the treatment, then, the raw sludge is normally fed through a heat exchanger to achieve initial heating, next, heated to the treatment temperature by direct injection of steam or otherwise and held at elevated temperature for a predetermined conditioning period. After conditioning, the sludge is fed back through the heat exchanger to transfer heat to the incoming cold sludge for initial heating thereof and is then passed to settlement tanks, after which it may be filtered to form cake for further processing or disposal.

Heat exchangers of the concentric double-wall pipe configuration are commonly employed in the above-described heat treatment of sewage sludge where heat exchange between fluids is required. The heat treatment of sewage sludge is an application in which the fluid undergoing treatment contains substantial amounts of fiber. This fiber tends to accumulate at any obstructions in the flow path of the fluid, forming blockages, thus plugging the fluid channel and drastically reducing the flow of fluid through the heat exchanger.

This plugging is sometimes quite troublesome in horizontally oriented heat exchangers which must have supports for the central pipe extending through the fluid channel from the central pipe to the wall of the outer pipe. These supports take the form of rods or studs located at spaced intervals along the length of the central pipe, and constitute obstructions in the fluid path providing sites at which accumulation of fibers occurs, ultimately resulting in the plugging referred to above.

It has now been discovered that by providing a support of a special type, a substantially unobstructed fluid path can be provided and the occurrence of plugging greatly diminished.

It is accordingly an object of this invention to provide an improved support for the central pipe of a horizontal double-pipe heat exchanger.

It is a further object of this invention to provide a horizontal double-wall heat exchanger which is less susceptible to plugging when operating on fiber-containing fluids.

Other advantages will become apparent from the following discussion taken in conjunction with the accompanying drawings, in which.

Figure 1:
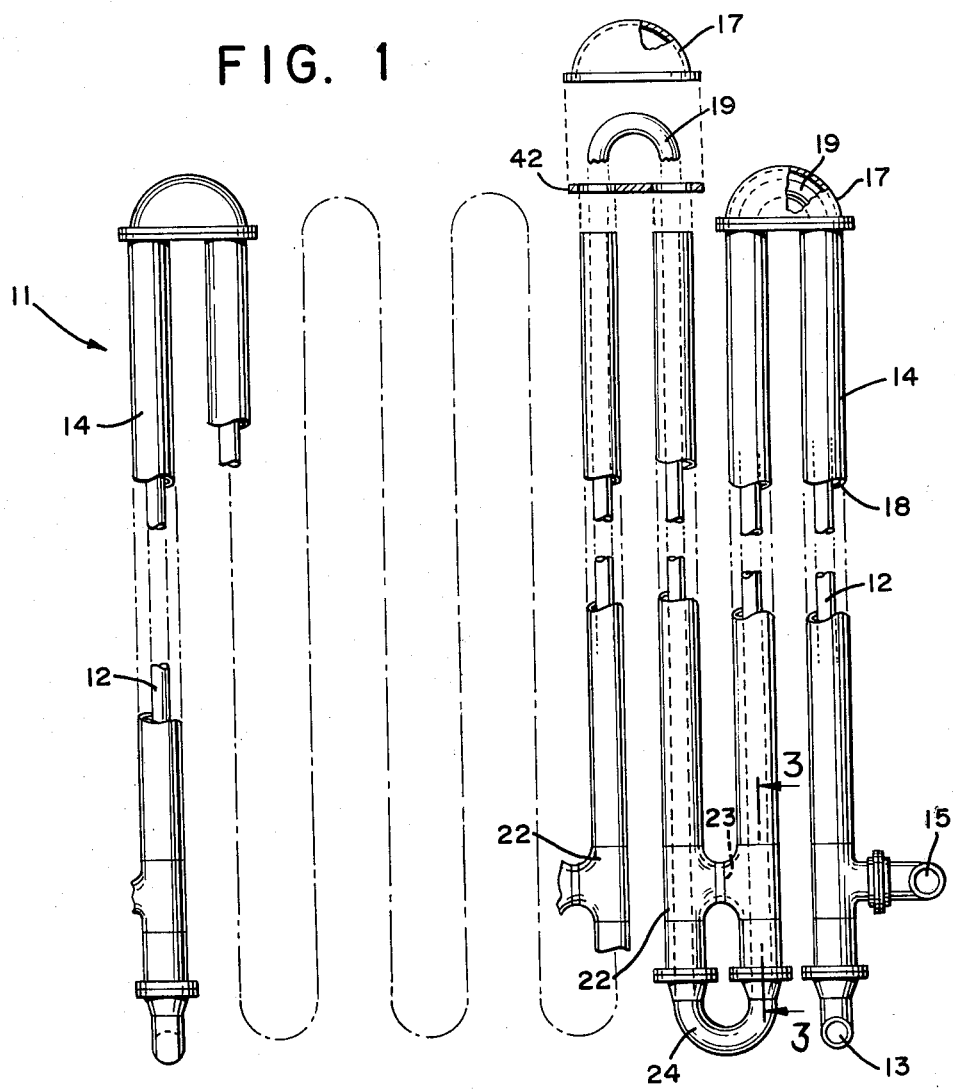
FIG. 1 is a plan view of one embodiment of a horizontal heat exchanger.

FIG. 3 is a view in section of the double-pipe heat exchanger taken along line 3—3 of FIG. 1, FIG. 4 is a view in section of the double-pipe heat exchanger taken along line 4—4 of FIG. 3, FIG. 5 is an alternative structure for a concentric pipe return bend, FIG. 6 is an end view of a modified support fin structure, FIG. 7 is a plan view of a serpentine support fin, and FIG. 8 is a plan view of a spiral support fin.

Broadly speaking, this invention is directed to providing in a horizontal concentric double-pipe heat exchanger, operating on fiber-containing fluids, a support for the central pipe thereof which is at least co-extensive in length with the fluid path about the central pipe and therefore presents no obstacles to the fluid flow at which the fibers in the fluid can become entrapped.

More specifically, in one preferred embodiment, the support of the present invention takes the form of a single support fin secured, as by welding, to the inner pipe and extending into contact with the internal surface of the outer pipe. Most importantly, the support fin follows the configuration of the heat exchanger; that is, it is essentially a straight fin where the concentric pipes are straight, and follows the curve of the concentric pipes at the return bends. It is an idea central to this invention that the fluid flowing in the annular passageway between the concentric pipes of the heat exchanger, never "sees" an end of the support fin, so that the fibers in the fluid do not encounter an obstruction, such as an end surface or shoulder, at which they might be stopped and accumulate.

Referring now to FIG. 1, there is disclosed a horizontal double-pipe heat exchanger 11. The heat exchanger 11 comprises concentric pipes, the outer pipe being 14 and the central pipe 12. The space between the two pipes constitutes the annular channel 18. A plurality of serially connected runs of such concentric piping are provided to maintain the fluids in heat exchanging relationship for the desired length of time taking into account such considerations as the velocity of the fluid, temperature differential, etc. For maintenamce purposes, the return bends 19 of the central pipe may be enclosed by an endcap 17 forming a fluid-tight conduit portion with the endplate 42 which accommodates the central pipe return bend 19. In the heat exchanger 11 illustrated in FIG. 1, a crossover conduit 22 is employed for conducting the fluid in the annular channels 18 between adjacent runs of the concentric heat exchange pipe. Thus, fluid in the annular channel 18 is conducted to channel 18 of the adjacent pipe through the crossover flow passage 23 in the crossover conduit 22. In this way, the central pipe external return bend 24 is exposed and readily accessible at one end of the heat exchanger pipe runs. However, if desired, endcaps may be employed at both ends of the heat exchanger pipe runs.

Figure 2:
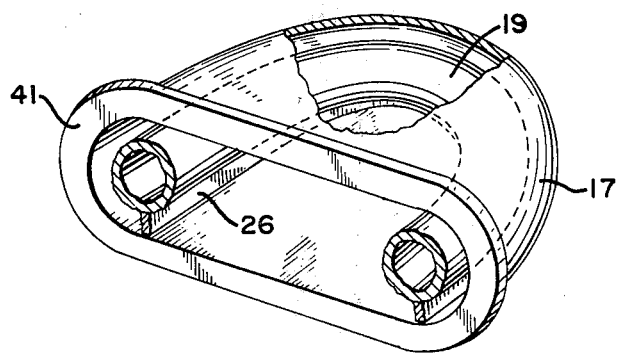
FIG. 2 is a view in perspective of a return bend and end cap.

The endcap structure is shown in greater detail in FIG. 2 with a return bend 19 of the central pipe 12 shown positioned within the endcap 17. The broken ends of central return bend 19 can be seen through the flange 41 of the endcap 17. The support fin 26 which is welded to the bottom of the return bend 19 and vertically depends therefrom can be seen as it conforms to the curvature of the return bend 19 within the endcap 17.

FIG. 3 shows a view taken along line 3—3 of FIG. 1 at the point where central pipe 12 intersects the crossover conduit 22. The outer pipe 14 is welded to lock ring flange 31, while the central pipe 12 is welded to the ring retainer end member 32. Split ring 38 is seated in groove 34 of ring retainer end member 32 and abuts the shoulder 39 on lock ring flange 31. The neck flange 41 is secured by bolts 42 to the ring flange 31 and the seal 43 of hexagonal cross-section is seated between the two flanges. An external return bend (see element 24 of FIG. 1) can readily be secured to neck flange 41 to accommodate the flow of fluid in central pipe 12. It will be seen that the annular channel 18 terminates adjacent ring retainer end member 32 and lock ring flange 31. The central pipe 12 is supported in its horizontal position by the support fin 26 which is a continuous length of fin terminating only as it abuts ring retainer end member 32, well beyond the crossover passage 23. The fluid in the annular channel 18, moving in the direction of the arrow 37, turns at a right angle to gain ingress to the crossover passage 23. The support fin 26, since it extends beyond the crossover conduit 22, presents no edges to the fluid flowing in the annular channel 18 at which the fibers in the fluid might become lodged to form blockages. Thus, wherever concentric piping is employed in the system, the support fin for the central pipe is at least as long as the fluid path in the annular channel between the concentric pipes. The fluid in the crossover passage 23, at egress therefrom, must again turn at a right angle to enter channel 18 of the succeeding concentric pipe heat exchanger run.

In FIG. 4, a view through the crossover passage 23 is shown and the support function of the support fins 26 is clearly evident. The flow of fluid between the annular channels 18 is from right to left in this showing.

Turning now to FIG. 5, there is shown an alternative structure for a concentric pipe return bend in which all joints are welded and, in that sense, this concentric return bend is a permanent structure. The ends of straight elements of the heat exchanger are shown; that is, the outer pipe 14 and the central pipe 12. In addition, an outer pipe return bend 54 and a central pipe return bend 52 are provided. The support fin 26 constitutes a smooth continuous curve from one central pipe 12 through central pipe return bend 52 to the parallel central pipe 12. With this arrangement, during assembly, the central return bend 52 can be moved adjacent the ends of the central pipe 12. With the outer return bend 54 in loose assembly about the central return bend 52 and in a withdrawn position to expose the abutting ends of the central pipes 12 and the central return bend 52, the welds 61 are made to permanently join the central return bend 52 to the central pipes 12. The support fin 26 segments on the central return bend 52 and on the central pipe 12 are welded at the point of abutment to form a single smooth-surfaced fin support. Split rings 56 are then positioned around the central pipe 12 and are welded in position at 57 and 59 to permanently join the outer pipe members 14 to the outer return bend 54.

It is thus seen that with the support fin of the present invention a smooth streamlined flowpath has been provided for the fiber-containing fluids in which no ends or shoulders present obstructions in the flowpath at which fibers might become lodged and accumulate to plug the flowpath.

The support fin of this invention has been shown as a single, generally straight or smoothly curved member, and this is the preferred embodiment of the invention. However, it is clear that a pair of closely-spaced fins in an almost parallel arrangement along the bottom of the central pipe would very nearly serve as well, and even perhaps give some advantage in stability of the central pipe. Such an arrangement is shown in FIG. 6, where a pair of support fins 46 are utilized for supporting the central pipe 12. In this parallel arrangement of support fins, it is recognized that there is some dead space between the two support fins in which no fluid at all can flow. Another arrangement which would be satisfactory, although involving additional fabrication expense, would be a serpentine support fin 64 (see FIG. 7) on the lower half of the central pipe circumference, the convolutions of which would traverse perhaps a 120° angle. Another possible arrangement is the spiral support fin 67 (shown in FIG. 8) perhaps making a complete revolution about the central pipe every 7 feet or so. The pitch in FIGS. 7 and 8 is exaggerated. In addition, the support fin of predetermined configuration might be integral with the wall of the outer pipe rather than with the central pipe, merely extending into contact with the latter. For example, the fin might be cast integrally with the wall of the outer pipe or the fin could be provided by cold forming the outer pipe wall inwardly.

As described above, it is possible to use end caps of the type shown in FIG. 2 at both ends of the heat exchanger runs. It is also possible to employ concentric return bends of the type shown in FIG. 5 at both ends of the heat exchanger runs. Combinations of the various end constructions can be used (as, for example, is shown in FIG. 1 where a crossover conduit is employed at one end of the heat exchanger run while an end cap is used at the other end) as dictated by operating considerations. Thus, end cap structures can be alternated with concentric return bends.

It is recognized that heat exchange fins are known in the prior art where a plurality of fins have long been provided on the internal pipe of concentric pipe heat exchangers to assure rapid heat transfer. Such a structure would not serve in the present case, where heat transfer through the one (or possibly two) support fins is minimal and not an important consideration. The fibers in the fluid which flows through the annular channel of the heat exchanger of the present invention would be trapped and accumulate about the ends of the fins of this prior art heat exchanger. Thus, plugging is initiated which would very soon choke the flow of fluid in the channel. We are not aware of any precautions taken in the structure of these prior art heat exchangers to eliminate exposure of the ends of the fins as is called for in the present invention.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appendant claims.

We claim:

1. A horizontal fluid heat exchanger treating fiber-containing fluids comprising a plurality of runs of substantially concentric pipes for accommodating a flow of fluid at one temperature through a central pipe and a flow of fiber-containing fluid at a different temperature through an annular channel between said pipes to thereby effect heat exchange between said fluids, the central pipe being supported in position by a continuous, relatively smooth-surfaced fin secured to at least one of said pipes and in contact with the other of said pipes, said support fin being at least coextensive in length with the flow path of the fluid in the said annular channel without significantly affecting the length of said flow path whereby said annular channel is made less susceptible to plugging by fibers.

2. The horizontal fluid heat exchanger of claim 1 in which the support fin is vertically oriented and is welded to the central pipe.

3. The horizontal fluid heat exchanger of claim 1 in which the support fin has a spiral configuration about the central pipe and is welded thereto, the pitch of said spiral fin being substantially less than 1 revolution per foot of pipe length.

4. The horizontal fluid heat exchanger of claim 1 in which the support fin has a serpentine configuration, the convolutions of which are confined to the lower half of the central pipe, and in which the fin is welded to the central pipe.

5. A horizontal fluid heat exchanger including a plurality of runs of substantially concentric pipes joined serially at the ends thereof for accommodating a flow of fluid at one temperature through a central pipe and a flow of fiber-containing fluid at a different temperature through an annular channel between said pipes to thereby effect heat exchange between said fluids, the central pipe being supported in position by a continuous, relatively smooth-surfaced fin secured to at least one of said pipes and in contact with the other of said pipes, the support fin being at least coextensive in length with the flow path of the fluid about said central pipe and smoothly following the configuration of said central pipe, a removable end cap joining successive runs of said concentric pipe, the end cap constituting a chamber through which fluid can pass from the annular channel of one concentric pipe run to the annular channel of the succeeding concentric pipe run, a central pipe return bend accommodated within said end cap chamber, a support fin secured to and conforming to the configuration of the return bend, said return bend support fin smoothly joining the support fins in said annular channels whereby said annular channels are made less susceptible to plugging by fibers.

6. A horizontal fluid heat exchanger including a plurality of runs of substantially concentric pipes joined serially at the ends thereof for accommodating a flow of fluid at one temperature through a central pipe and a flow of fiber-containing fluid at a different temperature through an annular channel between said pipes to thereby effect heat exchange between said fluids, the central pipe being supported in position by a continuous, relatively smooth-surfaced fin secured to at least one of said pipes and in contact with the other of said pipes, the support fin being at least coextensive in length with the flow path of the fluid about said central pipe and smoothly following the configuration of said central pipe, a crossover conduit for conducting fluid from the annular channel of one concentric heat exchanger run to the serially connected annular channel of the adjacent concentric heat exchanger run, the crossover conduit having an egress opening and an ingress opening communicating with the respective annular channels of the heat exchanger runs, the support fins for said central pipes extending past said ingress and egress openings so that the flow of fluid through the annular channel into the ingress opening of the crossover conduit through the egress opening and into the annular channel of the second heat exchanger run does not encounter any fiber-trapping end of said support fin, a removable external return bend joining said central pipes in serial connection, thereby accommodating the fluid which is conducted past said crossover conduit in said central pipes, said crossover conduit and external return bend serial connection for the concentric pipe being provided at one end of each pipe run, while at the other end of each pipe run the serial connection is provided by a removable end cap which accommodates a central pipe return bend with attached support fin whereby said annular channels are made less susceptible to plugging by fibers.

7. A horizontal fluid heat exchanger including a plurality of runs of substantially concentric pipes joined serially at the ends thereof for accommodating a flow of fluid at one temperature through a central pipe and a flow of fiber-containing fluid at a different temperature through an annular channel between said pipes to thereby effect heat exchange between said fluids, the central pipe being supported in position by a continuous, relatively smooth-surfaced fin secured to at least one of said pipes and in contact with the other of said pipes, the support fin being at least coextensive in length with the flow path of the fluid about said central pipe and smoothly following the configuration of said central pipe, concentric pipe return bends joining successive runs of said concentric pipe, said concentric pipe return bends each comprising a central pipe return bend having an exterior fin vertically depending therefrom and conforming to the curvature thereof, said exterior fin smoothly joining said support fins whereby said annular channel is made less susceptible to plugging by fibers.

8. A horizontal fluid heat exchanger including a plurality of runs of substantially concentric pipes joined serially at the ends thereof for accommodating a flow of fluid at one temperature through a central pipe and a flow of fiber-containing fluid at a different temperature through an annular channel between said pipes to thereby effect heat exchange between said fluids, the central pipe being supported in position by a continuous, relatively smooth-surfaced fin secured to at least one of said pipes and in contact with the other of said pipes, the support fin being at least coextensive in length with the flow path of the fluid about said central pipe and smoothly following the configuration of said central pipe, concentric pipe return bends alternating with removable end caps in joining said successive runs of concentric pipe, the said end caps providing a flow path for the fluid between said annular channels and accommodating a central pipe return bend with attached support fin whereby said annular channels are made less susceptible to plugging by fibers.

9. A double-pipe fluid heat exchange element adapted for horizontal orientation comprising concentric pipes for accommodating a flow of fluid at one temperature through the central pipe and a flow of fiber-containing fluid at a different temperature through an annular channel between the central and outer pipes to thereby effect heat exchange between said fluids, said central pipe being of hair pin configuration and supported in position by a single continuous, smooth-surfaced fin which is secured to the exterior of said central pipe, along the entire length thereof, and extends into contact with the interior of said outer pipe, said fin being at least coextensive in length with the flow path of the fiber-containing fluid in said annular channel and said outer pipe having a generally hairpin configuration comprising a pair of straight lengths of pipe joined by a removable end cap whereby said annular channel is made less susceptible to plugging by fibers.

* * * * *